Dec. 2, 1930.  A. O. AUSTIN  1,783,271
HIGH POTENTIAL INSTALLATION
Filed May 25, 1925

INVENTOR.
Arthur O. Austin
BY Nissen & Crane
ATTORNEYS

Patented Dec. 2, 1930

1,783,271

UNITED STATES PATENT OFFICE

ARTHUR O. AUSTIN, OF BARBERTON, OHIO, ASSIGNOR, BY MESNE ASSIGNMENTS, TO THE OHIO BRASS COMPANY, OF MANSFIELD, OHIO, A CORPORATION OF NEW JERSEY

HIGH-POTENTIAL INSTALLATION

Application filed May 25, 1925. Serial No. 32,712.

This invention relates to supports for high potential conductors and has for its object the provision of means for minimizing the tendency to flash over between such conductors and ground. The invention is exemplified in the combination and arrangement of parts shown in the accompanying drawing and described in the following specification and it is more particularly pointed out in the appended claim.

Figures 1, 2:
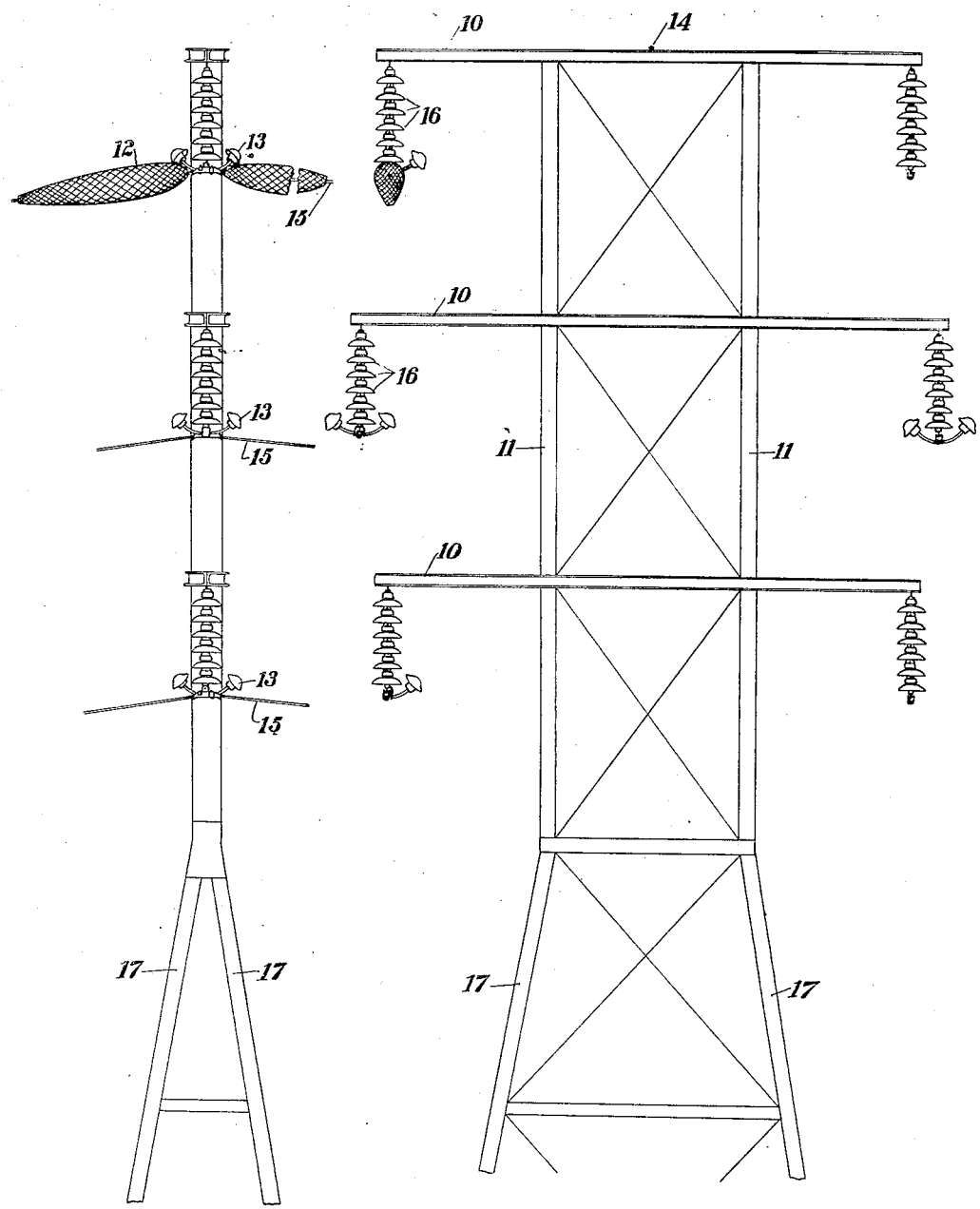
Fig. 1 is a side elevation of a portion of a high potential tower having one embodiment of the present invention applied thereto.
Fig. 2 is an elevation of the tower shown in Fig. 1 but looking in the direction of the transmission line.

In high voltage transmission lines there seems to be a very material increase in the number of arcs to ground for a given voltage and tower clearance where the size of the conductor or connected mileage is increased. In order to reduce this tendency to arc to ground, an insulated control shown in previous Patent No. 1,521,743 may be applied to advantage to reduce the number of these flash-overs, particularly for high voltage oscillatory disturbances. The discharge from the conductor may also be increased by the use of insulated controls or conductor cages.

As shown in the drawing cross arms 10 are supported on an upper attachment portion comprising uprights 11. Conductors 15 are supported from the cross arms 10 by insulators 16. The attachment frame comprising the uprights 11 is carried on a base portion having diverging legs arranged in pairs spaced apart transversely of the conductor lines but the legs of each pair are connected at their tops to restrict the extent of the support in the direction of the length of the line. The limited extent of the upper portion of the tower adjacent the conductors minimizes the effect of the tower on the field surrounding the conductors and consequently reduces the tendency to flash over from the conductors to the tower. This makes it possible to use the flux control devices of my previous patents to the best advantage. Insulated flux controls 13 are attached to the conductors at points opposite the support as these are the points of greatest stress due to the tower. Conductor cages 12 may extend along the conductors away from the supports for a short distance where the influence of the support is greatest.

Since the field about the conductor is set up by the presence of the tower, its shape or design is an important factor in the problem. Where the face of the tower is large, it may be necessary to provide means for preventing discharge for a considerable distance along the conductor or until the intensity of the field produced by the tower is materially reduced. Where the tower is wide, the cost of this protection may be very considerable or the efficiency of the insulated control reduced for certain classes of electrical disturbances. In order to prevent discharge from the conductor for oscillatory disturbances it may be necessary to run the insulated control well up into the field so that there is greater tendency to discharge under impact. Where the face of the tower is small, however, it is not necessary to go to such extremes to prevent discharge from the conductor.

The towers as heretofore made either provide a high mechanical strength with the danger of increased flash-overs or the mechanical strength has been deficient. The skeleton tower provides a good mechanical strength but owing to the distance it extends in the direction of the length of the conductor, the problem of preventing flash-over is increased. In the case of the flexible or A frame structures, the electrical conditions are good, but the mechanical conditions are poor.

The present invention combines the good points of both, greatly reducing their respective disadvantages. This permits raising the flashover voltage of the conductor or insulator in the vicinity of the tower much more effectively.

In order to accomplish the desired result, the lower portion of the tower shown in Fig. 1 is made with spaced members. This permits of building the lower part of the tower so that it will have good mechanical strength for the stresses ordinarily imposed by the conductors. The upper portion of the tower, however, is made up of a single element, having small width in the direction of the conductor. This member might be a channel, I-beam, tubular member or a narrow latticed member. Cross arms 10 are attached to the narrow vertical members 11. These cross arms are preferably made small in size in order to keep the field set up by the tower a minimum. These cross arms may be channels set back to back as shown, tubular members or I-beams or any other suitable section. Where clearances will permit, they may also be braced to increase their strength for vertical loads, providing the bracing does not interfere seriously with the field about the conductor or cut down the clearance between conductor and ground.

Where the width of tower as heretofore constructed is large, the tendency to discharge from the conductor extends a considerable distance and a conductor cage such as shown at 12 in the drawing or insulated controls 13 would have to extend a considerable distance out along the conductor or more would have to be attached to the conductor to prevent discharge. Where this upper portion of the tower is made narrow as in the present invention less protection of this nature will give excellent results. In order to increase the mechanical strength of the structure, a ground wire 14 may be attached to the tower. In order to further increase the stiffness occasional towers may be guyed. The flexible upper portion of the tower makes it possible to utilize the guy which might not be effective on the rigid structure. This is due to the fact that the spring or give in the upper portion of the structure will permit the guy to take up the load.

I claim:

A support for high potential transmission lines comprising two pairs of posts, the pairs being spaced from each other in a direction transverse to the line, and the posts of each pair being connected at their tops and spaced at their bottoms in the direction of the line, a single unitary structural member extending upwardly from the top of each pair of posts, a horizontally disposed cross arm connecting said unitary members and supported thereby above the tops of said posts, and a transmission line mounted on said cross arm.

In testimony whereof I have signed my name to this specification on this 21st day of May A. D. 1925.

ARTHUR O. AUSTIN.